(12) United States Patent
Strashny

(10) Patent No.: US 11,364,796 B2
(45) Date of Patent: Jun. 21, 2022

(54) KINETIC ENERGY RECOVERY SYSTEM

(71) Applicant: Perkins Engines Company Limited, Peterborough (GB)

(72) Inventor: Igor Strashny, Peoria, IL (US)

(73) Assignee: Perkins Engines Company Limited, Peterborough (GB)

( * ) Notice: Subject to any disclaimer, the term of this patent is extended or adjusted under 35 U.S.C. 154(b) by 611 days.

(21) Appl. No.: 16/304,076

(22) PCT Filed: Jun. 12, 2017

(86) PCT No.: PCT/EP2017/064303
§ 371 (c)(1),
(2) Date: Nov. 21, 2018

(87) PCT Pub. No.: WO2017/216114
PCT Pub. Date: Dec. 21, 2017

(65) Prior Publication Data
US 2019/0217701 A1    Jul. 18, 2019

(30) Foreign Application Priority Data
Jun. 14, 2016 (EP) .................................. 16174423

(51) Int. Cl.
*B60K 17/26* (2006.01)
*B60K 6/10* (2006.01)
(Continued)

(52) U.S. Cl.
CPC ............. *B60K 17/26* (2013.01); *B60K 6/105* (2013.01); *B60K 6/365* (2013.01); *B60K 17/10* (2013.01);
(Continued)

(58) Field of Classification Search
CPC ........ B60K 17/26; B60K 17/10; B60K 6/105; B60K 6/365; B60L 50/30; F16H 47/04; F02N 15/02; F02N 11/00; F02N 5/04
See application file for complete search history.

(56) References Cited

U.S. PATENT DOCUMENTS 3,052,098 A * 9/1962 Ebert .................... F16H 61/42
60/492
4,405,031 A    9/1983 Rotter
(Continued)

FOREIGN PATENT DOCUMENTS

CN    101424282    5/2009
CN    102785570    11/2012
(Continued)

OTHER PUBLICATIONS

International Search Report for Application No. PCT/EP2017/064303 dated Sep. 26, 2017.
(Continued)

*Primary Examiner* — Tinh Dang

(57) ABSTRACT

A kinetic energy recovery system (KERS) is provided. The KERS (1) comprises a first speed-up gear arrangement (12) having an input (10) connectable to a vehicle powertrain. The KERS further comprises a hydraulic variator made up of first and second bent axis motors (20,22) fluidly connected to one another, wherein at least the first motor (20) is a variable displacement motor, and the first motor (20) is connected to an output of the first speed-up gear arrangement (12). A second speed-up gear arrangement (34) has an input connected to the second motor (22). At least one flywheel (52) is connected to an output of the second speed-up gear arrangement (34), where the at least one flywheel is located in a vacuum within at least one flywheel chamber (58).

15 Claims, 7 Drawing Sheets

(51) Int. Cl.

| | | |
|---|---|---|
| *B60K 6/365* | (2007.10) | |
| *B60K 17/10* | (2006.01) | |
| *F16H 47/04* | (2006.01) | |
| *B60L 50/30* | (2019.01) | |
| *F16F 15/30* | (2006.01) | |
| *F02N 11/00* | (2006.01) | |
| *F02N 5/04* | (2006.01) | |
| *F02N 15/02* | (2006.01) | |
| *F02N 15/04* | (2006.01) | |

(52) U.S. Cl.
CPC ............... *B60L 50/30* (2019.02); *F02N 5/04* (2013.01); *F02N 11/00* (2013.01); *F02N 15/02* (2013.01); *F16F 15/30* (2013.01); *F16H 47/04* (2013.01); *B60Y 2400/162* (2013.01); *F02N 15/046* (2013.01); *Y02T 10/64* (2013.01); *Y02T 10/70* (2013.01)

(56) References Cited

U.S. PATENT DOCUMENTS

| | | | | |
|---|---|---|---|---|
| 5,766,107 | A * | 6/1998 | Englisch | ............... F16H 47/04 475/80 |
| 2008/0264054 | A1* | 10/2008 | Rousseau | ............ F16H 61/4139 60/484 |
| 2010/0212309 | A1 | 8/2010 | Dyck | |
| 2013/0123055 | A1* | 5/2013 | Mattsson | .................. F16H 3/62 475/31 |
| 2015/0148191 | A1 | 5/2015 | Shepherd | |

FOREIGN PATENT DOCUMENTS

| | | |
|---|---|---|
| CN | 102913408 | 2/2013 |
| DE | 202007015050 | 12/2007 |
| DE | 102008018373 A1 | 10/2008 |
| DE | 102010062789 | 6/2012 |
| JP | 2009275854 | 11/2009 |
| JP | 2012046179 | 3/2012 |
| JP | 2015189279 | 11/2015 |
| WO | 2013178980 | 12/2013 |
| WO | WO 2013/178980 A1 | 12/2013 |
| WO | 2014076216 | 5/2014 |
| WO | WO 2014/076216 A1 | 5/2014 |
| WO | 2017216114 | 12/2017 |

OTHER PUBLICATIONS

European Patent Office Examination Report for Application No. 16 174 423.0-1012, dated Jun. 10, 2021, 5 pages.

* cited by examiner

KINETIC ENERGY RECOVERY SYSTEM

CROSS-REFERENCE TO RELATED APPLICATION

This Application is a 35 USC § 371 US National Stage filing of International Application No. PCT/EP2017/064303 filed on Jun. 12, 2017 which claims priority under the Paris Convention to European Patent Application No. 16174423.0 filed on Jun. 14, 2016.

FIELD OF THE INVENTION

The present invention relates to the field of hybrid powertrains for vehicles, and in particular to a kinetic energy recovery system (KERS) for selectively supplementing the power output from the prime mover of the vehicle.

BACKGROUND OF THE INVENTION

Hybrid powertrains which utilise a KERS are known. These KERS are utilised in order to store kinetic energy which would otherwise be dissipated during vehicle braking. Various KERS have been, proposed, in which the kinetic energy is stored in a reservoir via mechanical, electrical, hydraulic or pneumatic systems. The latter three systems can be prohibitively large for use in certain types of vehicle given the need to store the kinetic energy in relatively large batteries or accumulators. The flywheels used in mechanical KERS are relatively compact and also provide better overall efficiency than the other types available. The flywheels also have a relatively long life cycle when compared to the storage means in non-mechanical KERS, irrespective of whether they are required to operate in shallow or deep discharge cycles.

SUMMARY OF THE INVENTION

According to a first aspect of the invention there is provided a kinetic energy recovery system (KERS), comprising:
  a first speed-up gear arrangement having an input connectable to a vehicle powertrain;
  a hydraulic variator comprising first and second bent axis motors fluidly connected to one another, wherein at least the first motor is a variable displacement motor, and the first motor is connected to an output of the first speed-up gear arrangement;
  a second speed-up gear arrangement having an input connected to the second motor; and
  at least one flywheel connected to an output of the second speed-up gear arrangement, the at least one flywheel located in a vacuum within at least one flywheel chamber.

According to a second aspect of the invention there is provided a vehicle powertrain comprising a KERS according to the first aspect of the invention.

According to a third aspect of the invention there is provided a hydraulic variator comprising first and second bent axis motors fluidly connected to one another, wherein at least the first motor is a variable displacement motor.

According to a fourth aspect of the invention there is provided a method of controlling a kinetic energy recovery system (KERS) comprising a first speed-up gear arrangement connected to a vehicle powertrain and/or engine, a hydraulic variator comprising first and second bent axis motors fluidly connected to one another, a second speed-up gear arrangement and at least one flywheel connected to an output of the second speed-up gear arrangement, the method comprising the steps of:
  monitoring the vehicle powertrain for changes in operating status and/or power demands; and
  varying the displacement of at least one of the two motors so as to charge or discharge the KERS in response to a powertrain operating status change and/or power demand.

BRIEF DESCRIPTION OF THE DRAWINGS

Preferred embodiments of the present invention will now be described, by way of example only, with reference to the following drawings.

DETAILED DESCRIPTION OF THE DRAWINGS

Figure 1:
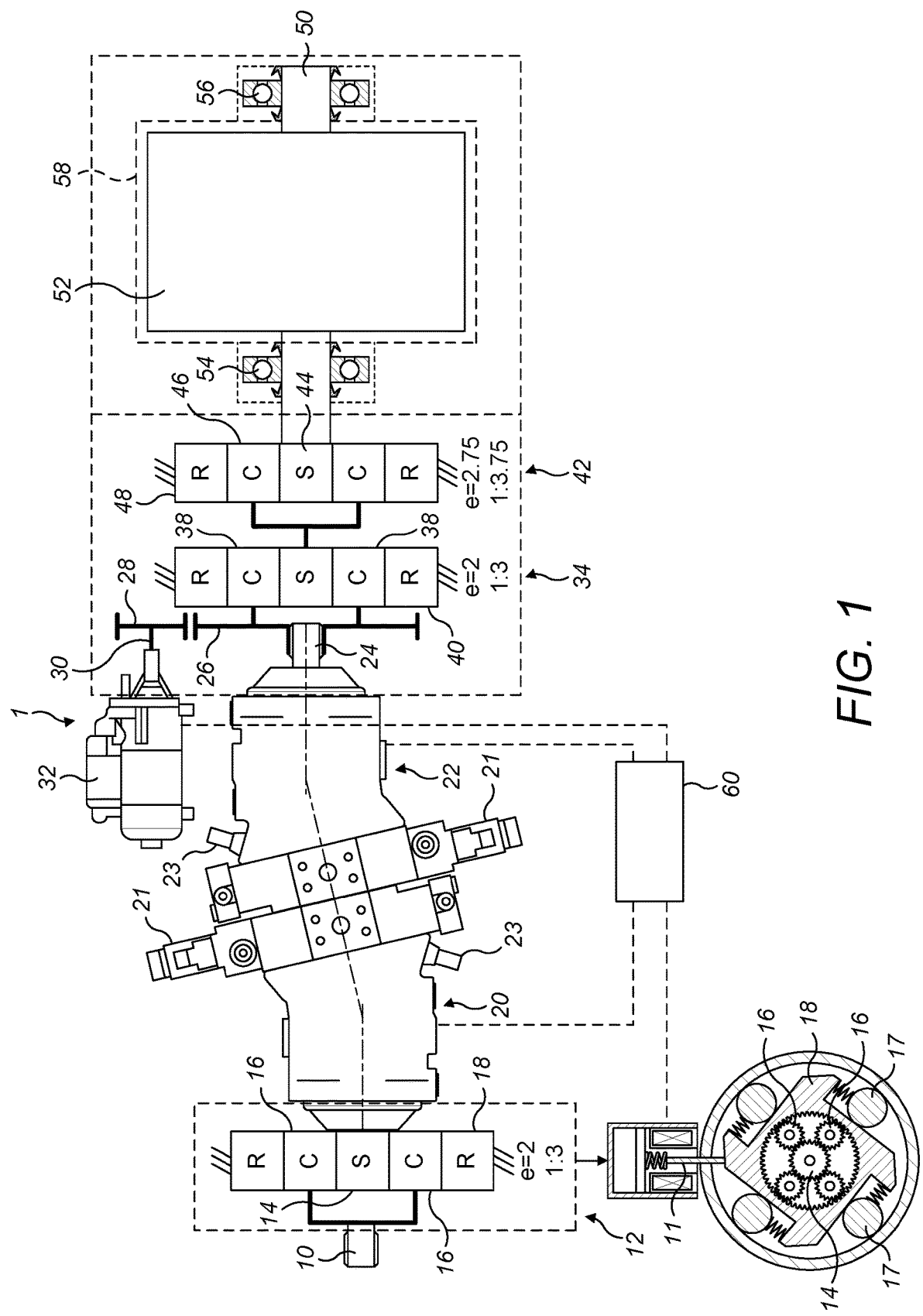
FIG. 1 is a schematic view of a first embodiment of a kinetic energy recovery system.

FIG. 1 provides a schematic illustration of a kinetic energy recovery system (KERS) 1. The KERS 1 has a first shaft 10 which in use will be connected to the primary drivetrain of a vehicle, which is shown schematically in FIG. 7 and will be described in further detail below.

The first shaft 10 is connected to a first planetary gear 12, and more specifically to a plurality of first planet gears 16 in the first planetary 12. The first planetary 12 also comprises a first ring gear 18 and a first sun gear 14. The first planetary 12 forms part of a one-way clutch wherein the first ring gear 18 may rotate within its housing 19 in one direction but is prevented from rotating in the opposite direction thanks to a known one-way roller bearing arrangement 17. The first planetary 12 also includes an electrically-actuated locking pin 11 which can selectively engage the first ring gear 18 such that it may not rotate in either direction. In this illustrated embodiment, the ratio of the first planetary is 1:3.

The first sun gear 14 of the first planetary 12 is connected to a first input/output shaft (not shown) of a first bent axis hydraulic motor 20. The first bent axis motor 20 is hydraulically connected back-to-back with a second bent axis hydraulic motor 22. In other words, the two motors 20,22 are fluidly connected with one another such that fluid pumped from one will drive the other, and vice versa. Each of the motors 20,22 has an inlet 21 and an outlet 23 connected to a supply of high pressure hydraulic fluid. As a result, the two motors 20,22 form a hydraulic variator for controlling kinetic energy input to, and output from, the KERS 1. The first motor may be a variable displacement motor whilst the second motor may be a fixed displacement motor, but in this preferred embodiment both motors 20,22 have variable displacements.

A second shaft 24 of the second motor 22 is connected to a first gear 26. The first gear 26 meshes with a second gear 28 which is non-rotatably connected to a motor shaft 30 of an electric starter motor 32. The first gear 26 is also connected to a second planetary gear 34, and more specifically to a plurality of second planet gears 38 within the second planetary 34. The second planetary 34 also includes a second sun gear 36 and a fixed second ring gear 40. The ratio of the second planetary 34 is preferably 1:3.

The second sun gear 36 is connected to a third planetary gear 42, and more specifically to a plurality of third planet gears 46 which make up the third planetary 42 along with a third sun gear 44 and a fixed third ring gear 48. The ratio of the third planetary 42 is preferably 1:3.75.

The third sun gear 44 is connected to a flywheel axle 50, which is itself non-rotatably connected to a flywheel 52. As a result, rotation of the third sun gear will rotate the flywheel 52 and vice versa. The flywheel axle 50 is rotatably supported by a pair of bearings 54,56 located either side of the flywheel 52. The flywheel 52 is located within a vacuum chamber 58.

An electronic control unit (ECU) 60 is also provided. The ECU 60 controls the operation of the KERS and is in communication with a supervisory ECU (not shown) which has overall control of the vehicle engine and power train. The ECU 60 oversees the various operating modes of the KERS and has control over; the activation of the locking pin 11 of the first planetary 12; the displacement of each of the variable displacement motors 20,22; and the starter motor 32.

Figure 2:
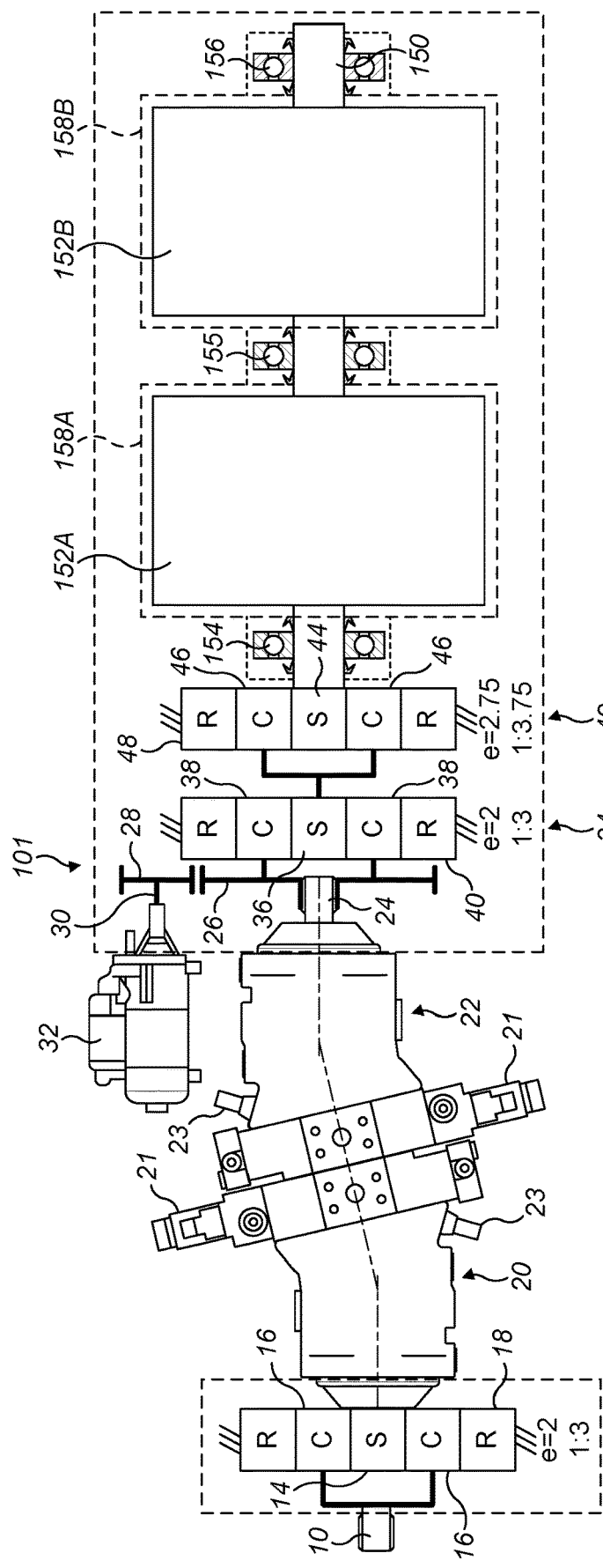
FIG. 2 is a schematic view of a second embodiment of a kinetic energy recovery system.

A second embodiment of a KERS 101 is schematically illustrated in FIG. 2. The majority of the components in this second embodiment are shared with the first embodiment, as are the preferred ratios of the planetaries 12,34,42. The shared components are therefore labelled with the same reference numbers and will not be referred to again here. It should be noted that the ECU shown in relation to the first embodiment is present in each of the additional embodiments described herein, but has been omitted from the respective figures for reasons of clarity.

The primary modification in this second embodiment is that the KERS 101 is provided with a pair of flywheels 152A,152B which are co-axially arranged and non-rotatably connected to an extended flywheel axle 150. As a result, rotation of the third sun gear 44 will rotate both flywheels 152A,152B and vice versa. The flywheel axle 150 is rotatably supported by three bearings: a pair of bearings 154, 156 located adjacent opposite ends of the flywheel axle 150, and a single bearing 155 located at an intermediate location on the axle 150 between the first and second flywheels 152A, 152B. Each flywheel 152A,152B is located within a respective vacuum chamber 158A,158B.

Figure 3:
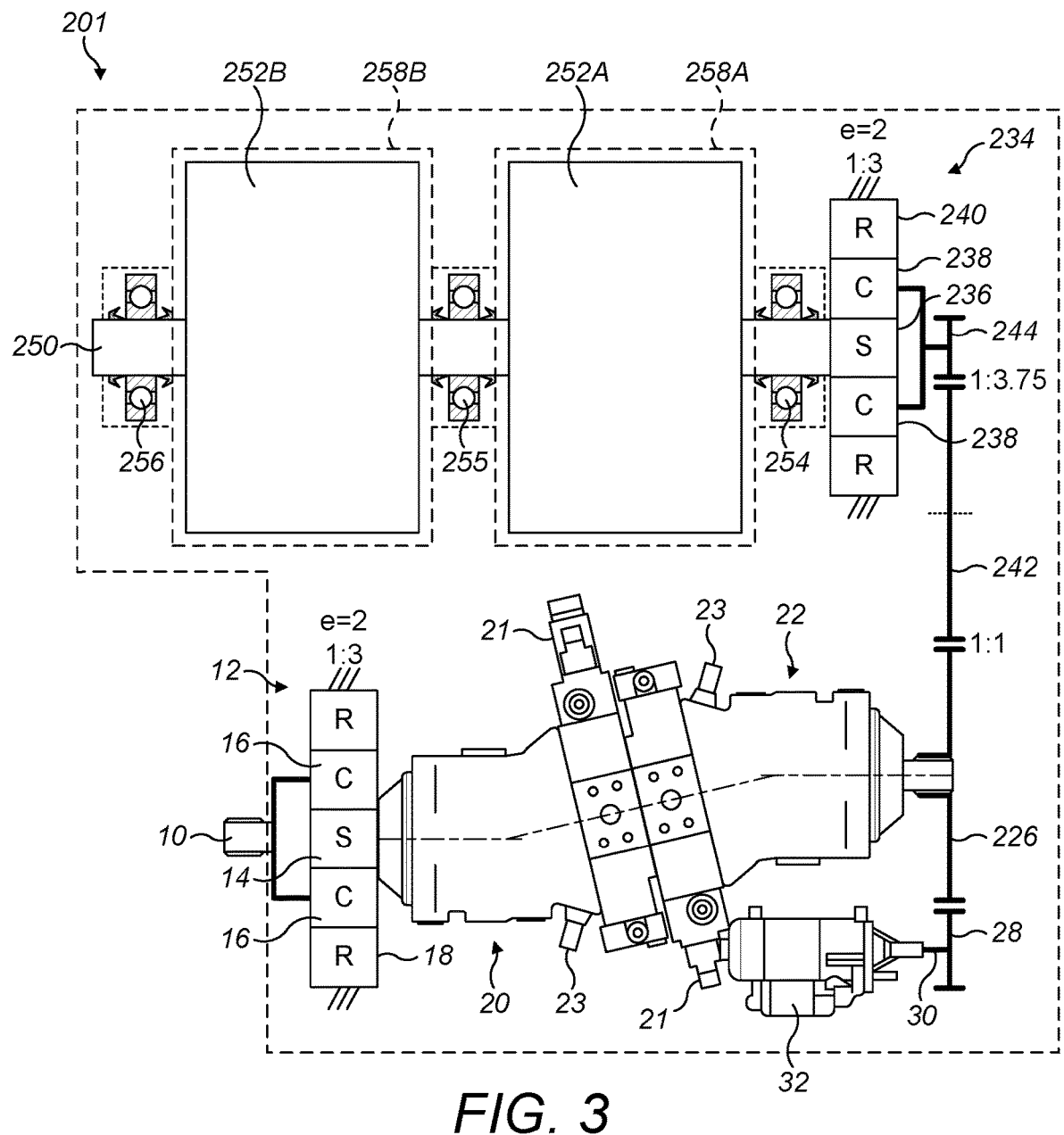
FIG. 3 is a schematic view of a third embodiment of a kinetic energy recovery system.

A third embodiment of a KERS 201 is schematically illustrated in FIG. 3. This embodiment also shares a number of components with the first and second embodiments, and again those components are labelled with the same reference numbers as before. Where this third embodiment differs is that there is only a single planetary gear, which will be referred to as the second planetary 234, between the motors 20,22 and the flywheels 252A,252B. Furthermore, the flywheels 252A,252B and that second planetary 234 are offset from the first planetary 12 and the motors 20,22. This arrangement is enabled by providing an idler gear 242 which is meshed with the first gear 226 off the motor 22 for counter-rotation, where the ratio between the idler gear and the first gear is preferably 1:1. The idler gear 242 transfers energy to the second planetary 234 via a spur gear 244, where the ration between the idler and spur gears is preferably 1:3.75. The spur gear 244 acts as the carrier for the second planet gears 238 of the second planetary, which also includes a fixed second ring gear 240 and a second sun gear 236. The second sun gear 236 is connected to the flywheel axle 250 such that rotation of the second sun gear 236 will rotate the pair of flywheels 252A,252B and vice versa. The flywheel axle 250 is rotatably supported by three bearings: a pair of bearings 254, 256 located adjacent opposite ends of the flywheel axle 250, and a single bearing 255 located at an intermediate location on the axle 250 between the first and second flywheels 252A,252B. Each flywheel 252A,252B is located within a respective vacuum chamber 258A,258B.

Figure 4:
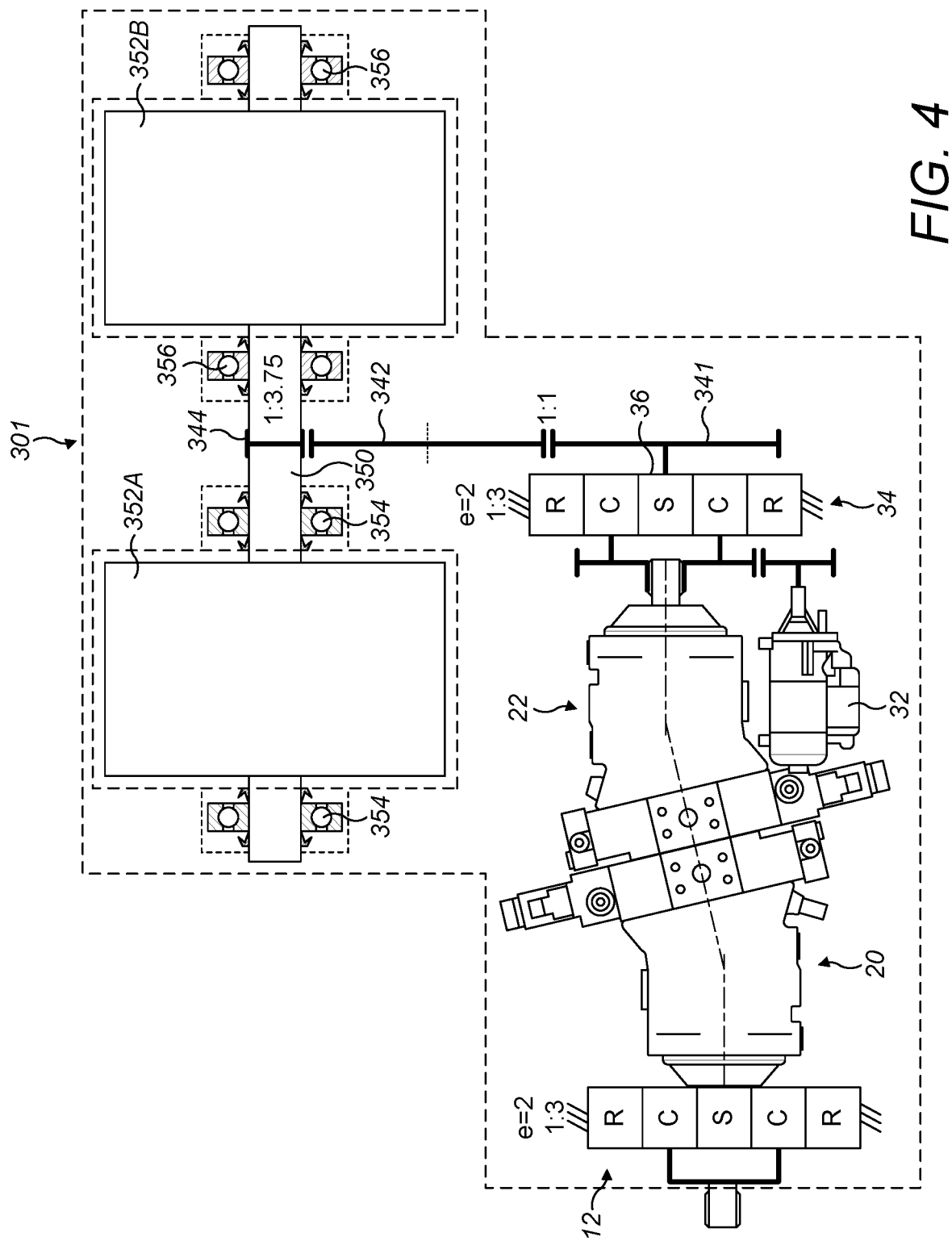
FIG. 4 is a schematic view of a fourth embodiment of a kinetic energy recovery system.

A fourth embodiment of a KERS 301 is schematically illustrated in FIG. 4. Here, the arrangement of the first planetary 12, motors 20,22, starter motor 32 and second planetary 34 is as in the first and second embodiments. However, a pair of flywheels 352A,352B are offset from those components. In this embodiment, the offset arrangement is provided by connecting a driving gear 341 to the second sun gear 36 of the second planetary 34 and meshing an idler gear 342 to that driving gear so as to provide counter-rotation. The ratio between the driving gear 341 and the idler gear 342 is preferably 1:1. The idler gear 342 also meshes with a spur gear 344 which in this embodiment is non-rotatably mounted on the flywheel axle 350. The ratio between the idler and spur gears is preferably 1.3.75. The spur gear 344 is located on the axle 350 between the pair of flywheels 352A,352B. The axle 350 is rotatably supported on two pairs of bearings 354,356, where each pair of bearings are, located on opposite sides of a respective flywheel 352A,352B. As before, each flywheel 352A,352B is located within a vacuum chamber 358A,358B.

Figure 5:
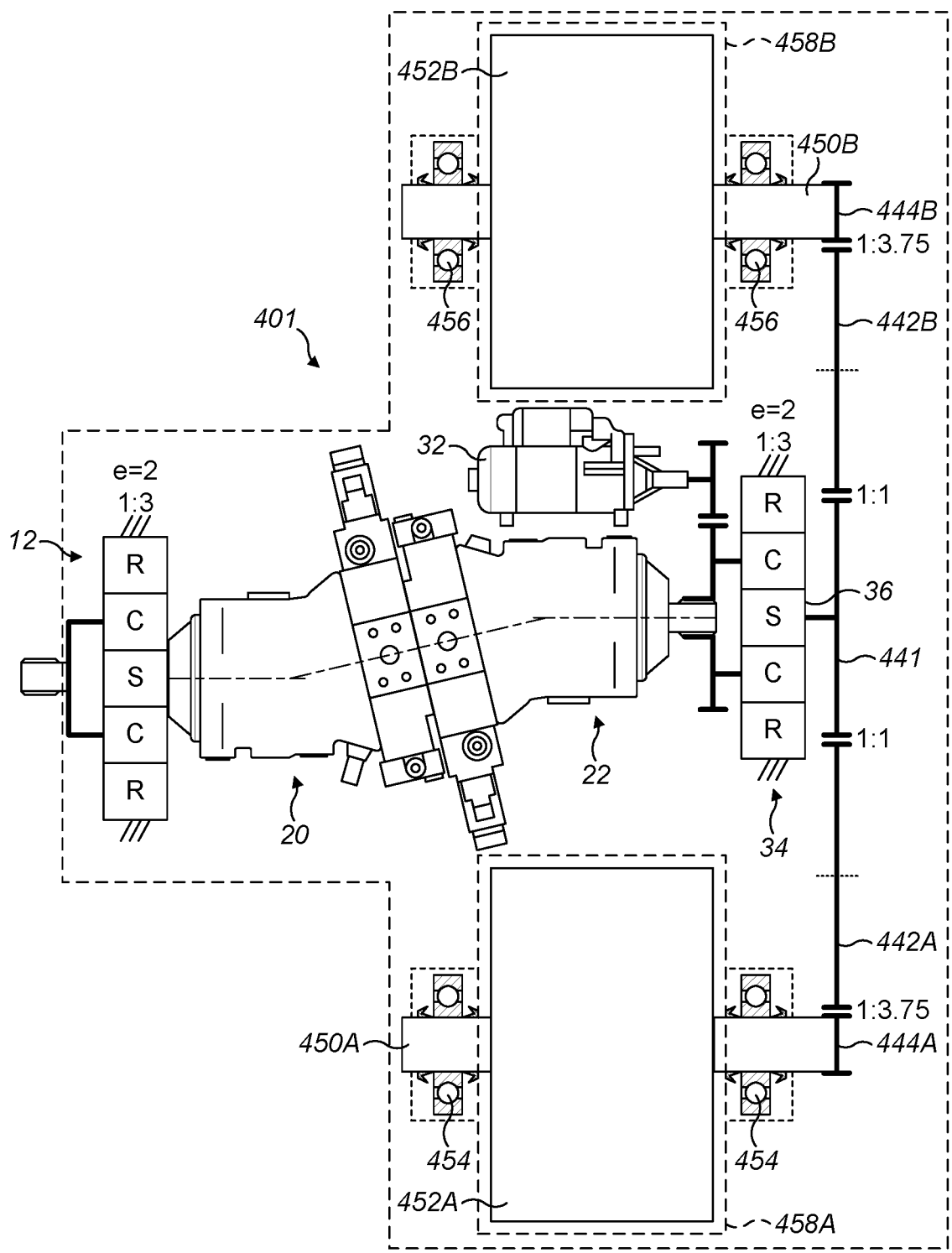
FIG. 5 is a schematic view of a fifth embodiment of a kinetic energy recovery system.

A fifth embodiment of a KERS 401 is schematically illustrated in FIG. 5. Here, the arrangement of the first planetary 12, motors 20,22, starter motor 32 and second planetary 34 is as in the first, second and fourth embodiments. In this embodiment, a driving gear 441 is connected to the second sun gear 36 of the second planetary 34. The driving gear 441 meshes with a pair of idler gears 442A, 442B whereby each idler gear provides counter-rotation. The ratio between the driving gear 441 and the idler gears 442A,442B is preferably 1:1. Each idler gear 442A,442B also meshes with a spur gear 444A,444B, each of which is non-rotatably mounted on separate flywheel axles 450A, 450B. The ratio between each respective pair of idler and spur gears is preferably 1:3.75. Each spur gear 444A,444B is located on a respective flywheel axle 450A,450B whereby rotation of the spur gear rotates a respective flywheel axle and a respective flywheel 452A,452B located thereon. Each axle 450A,450B is rotatably supported on a pair of bearings 454,456, where each pair of bearings are located on opposite sides of a respective flywheel 452A,452B. As before, each flywheel 452A,452B is located within a vacuum chamber 458A,458B. As a result of the aforementioned arrangement, the flywheels 452A,452B in this fifth embodiment are offset from one another.

INDUSTRIAL APPLICABILITY

The manner in which the KERS is operated will now be described. Although certain embodiments employ additional idler and/or spur gear arrangements so as to be packaged in different ways each of the embodiments operates in substantially the same manner. The method of operation will therefore be described primarily in relation to the first embodiment shown in FIG. 1.

The KERS has a number of operating modes which are controlled by the ECU 60, and these modes may include standby, starting, charging, and discharging modes. The KERS may also have retarding and forced spin-down modes. In the standby mode the vehicle engine/prime mover may be switched off, or else the engine may be on but there is no demand for either a charging or discharging event. In the standby mode, the ECU 60 instructs the variable displacement motor 2 20,22 to adjust their displacement to zero. This has the effect that the engine and flywheel (or input and output) sides of the KERS 1 are isolated from one another, and consequently no energy can be transferred into or out of the flywheel via the motors 20,22 irrespective of whether the engine is running or not.

If the engine is switched off and there is little or no kinetic energy still stored in the flywheel 52, the starting mode can be used to start the engine. In this mode, the ECU 60 receives an engine start command from the supervisory controller an initially sets the displacement of the variable displacement motors 20,22 at zero if they are not already in that state, such that the engine and flywheel sides of the KERS 1 are isolated from one another. The ECU 60 then activates the starter motor 32. With the flywheel side of the KERS 1 being isolated at this point, the turning over of the starter motor will spin up the flywheel 52 via the second and third planetaries 34,42. Once the ECU 60 has determined via one or more sensors (not shown) that, the flywheel is spinning at an appropriate speed it will instruct the variable displacement motors 20,22 to increase their displacement from zero. As a result, the energy from the spinning flywheel 52 is transferred through the motors 20,22 and first planetary 12 to the engine, thereby turning over and starting the engine.

Figure 6A:
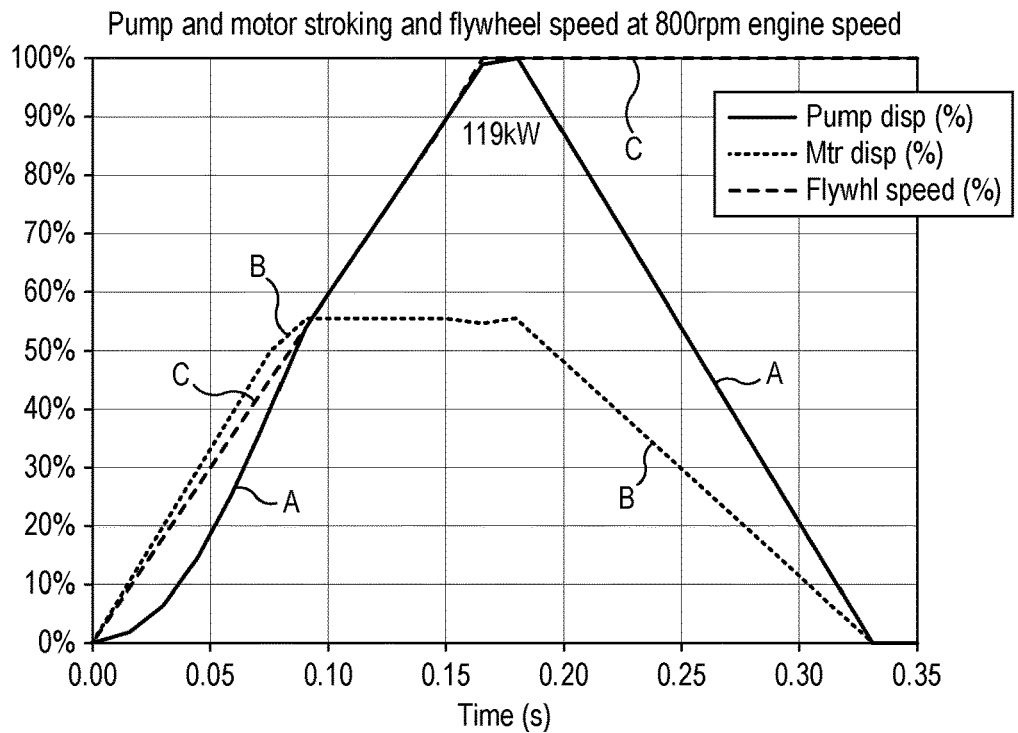
FIG. 6(a) is a graph showing the displacement of a hydraulic pump, hydraulic motor and flywheel of the KERS during a first charging event.
Figure 6B:
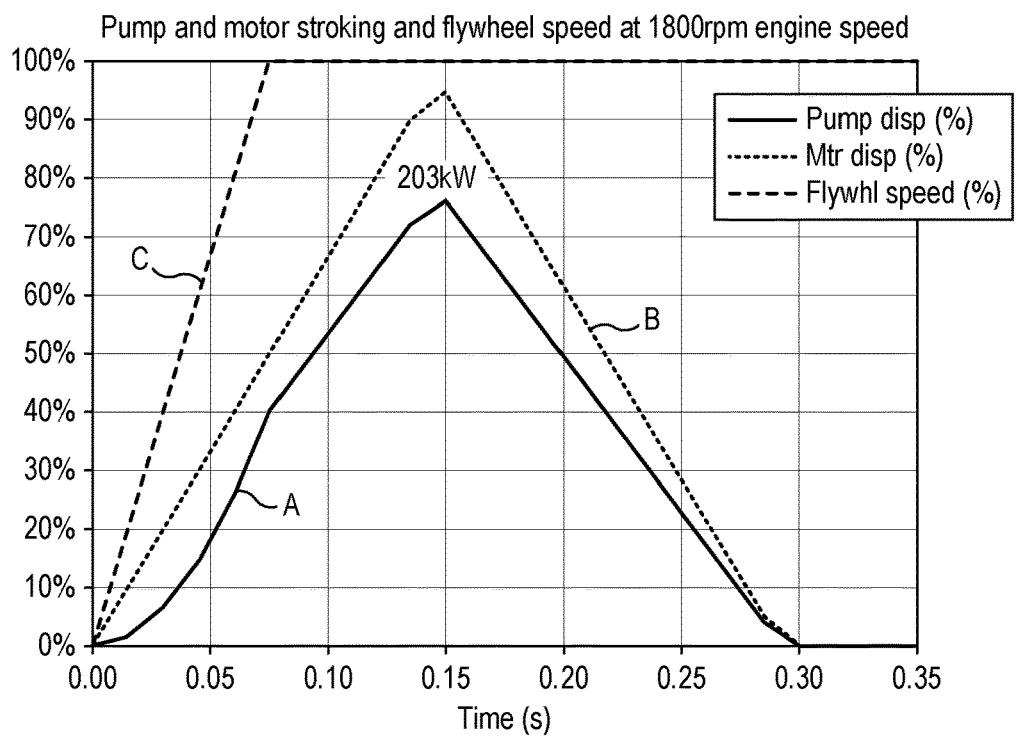
FIG. 6(b) is a graph showing the displacement of a hydraulic pump, hydraulic motor and flywheel of the KERS during a second charging event.

In the charging mode the KERS 1 is to transfer kinetic energy into the flywheel 52, typically whilst the vehicle is braking. The graphs of FIGS. 6(*a*) and 6(*b*) illustrate examples of how the ECU 60 adjusts the displacement of the first and second motors 20,22 and the resultant speed of the flywheel. FIG. 6(*a*) illustrates these variables at an engine speed of 800 rpm, whilst FIG. 6(*b*) illustrates the variables at an engine speed of 1800 rpm. In each of the graphs trace A represents the percentage displacement of the first motor 20, trace B represents the percentage displacement of the second motor 22, and trace C represents the percentage speed of the flywheel. In this mode, of course, the first motor 20 is acting as a pump and the second motor 22 is acting as a motor in response to the fluid being pumped from the pump.

Referring to the example of FIG. 6(*a*) where engine speed is 800 rpm, at the beginning of a charging event the displacement of the pump 20 and motor 22 are both zero and it is also assumed for this example that the flywheel speed is also zero. When charging is to take place the displacement of both the pump 20 and motor 22 is increased in a substantially linear manner. The displacement of the pump 20 is increased to maximum (100%) whilst the displacement of the motor 22 is increased to approximately 55% and then held there until it has been determined that the flywheel speed has increased from 0 to maximum speed. Once maximum flywheel speed has been reached, the ECU 60 will reduce the displacements of the pump 20 and motor 22 back to zero in a relatively linear manner. In the illustrated example, it takes approximately 0.17 s for the pump 20 to reach maximum displacement and for the flywheel to reach maximum speed. The flywheel will then continue to spin at maximum speed once the pump and motor 20,22 have both returned to zero displacement. The whole charging sequence has taken approximately 0.33 s and the total power generated by the variator (i.e. pump and motor combined) is 119 kW in the illustrated example.

A similar charging event is shown in FIG. 6(*b*) where in this case the engine speed is 1800 rpm. Again, the displacement of the pump and motor 20,22 are increased in a relatively linear manner, with the pump displacement being increased to approximately 76% and the motor displacement to approximately 95%. This increase in displacement takes approximately 0.15 s and the flywheel has already reached maximum speed after approximately 0.075 s. Again, the flywheel will continue to spin at maximum speed as the displacements of the pump and motor 20,22 are reduced to zero. The charging sequence has taken approximately 0.3 s and the total power generated by the variator (i.e. pump and motor) is 203 kW.

When the ECU 60 receives a supplementary power demand from the engine ECU it will enter the discharging mode, which is effectively the opposite process to that of the charging mode. At this point the flywheel 52 will be spinning at full speed, which in this example may be in the region of 52000 rpm. The two motors 20,22 will both be at zero displacement, which again has the effect of isolating the flywheel from the engine/prime mover. Once the power demand is received, the ECU 60 instructs both motors 20,22 to increase displacement. As a consequence the energy of the spinning flywheel 52 is passed via the reduction gearing effect of the third and second planetaries 42,34 to the second shaft 24 of the second motor 22. In this mode the second motor 22 will act as a pump, where the rotation of the second shaft 24 by the flywheel 52 via the associated planetaries 42,34 will cause hydraulic fluid to be pumped from the second motor 22 into the first motor 20. The speed of rotation of the first shaft of the first motor 20, and hence the amount of energy being discharged by the system, can be controlled by adjusting the displacement of one or both motors 20,22. In order to ensure that the discharging can take place as fast as possible, the ECU 60 communicates with a plurality of sensors in order to monitor the relative rotational speeds of the first sun gear 14 and the first planet gears 16 and their associated shaft 10 within the first planetary 12. When the ECU 60 has determined that the speeds are synchronised, or at least within a predetermined percentage of one another, the locking pin 11 is activated by the ECU 60 so as to engage the first ring gear 18 and thus prevent the first ring gear from rotating in either direction relative to the housing 19. The kinetic energy of the first shaft 10 transfers through the reduction gearing effect of the first planetary 12 to the engine in order to provide the supplementary power required.

As discussed above the ECU 60 may also include a retarding mode, which is similar to the discharging mode albeit that the energy of the flywheel is utilised in order to reduce engine power as opposed to increasing engine power. There may also be a forced spin-down mode which forcibly reduces the flywheel speed to zero.

Figure 7:
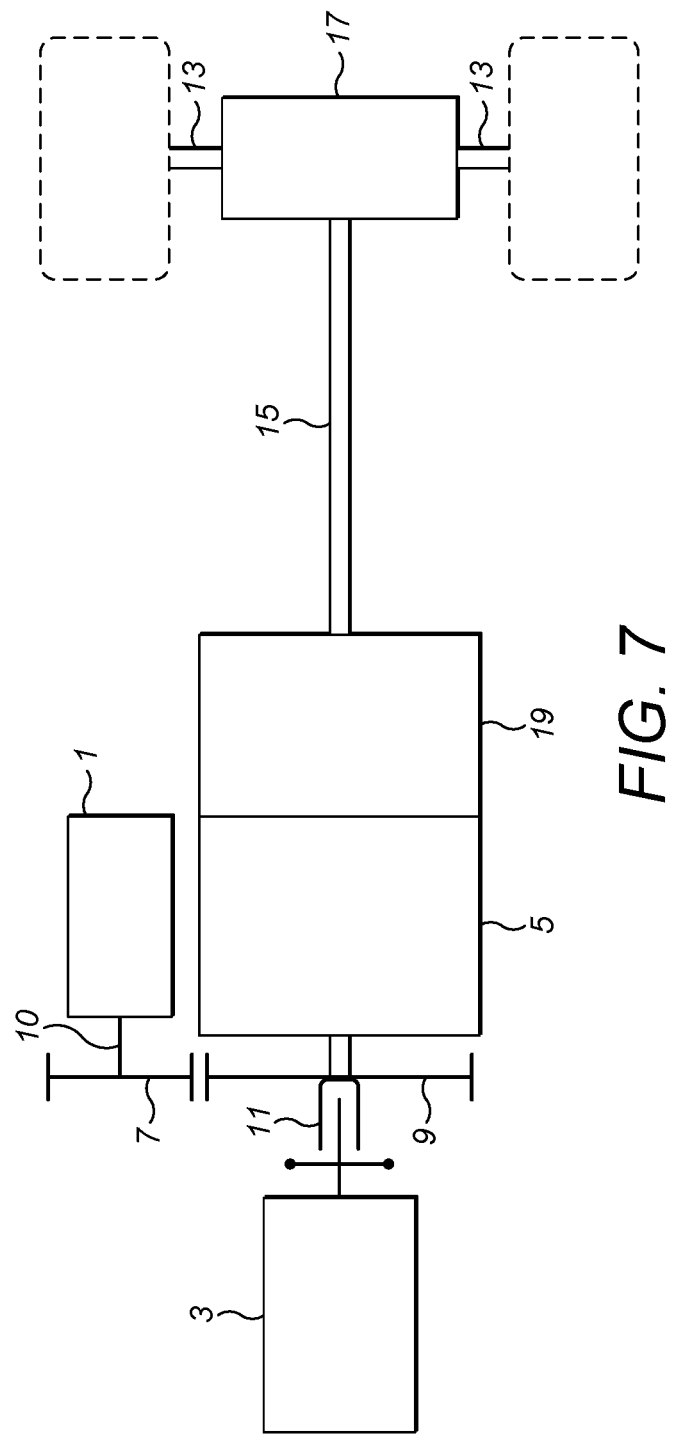
FIG. 7 is a schematic view of a vehicle drivetrain incorporating a KERS.

FIG. 7 shows in schematic form a vehicle drivetrain to which the KERS of the present invention may be connected. For example, the first shaft 10 of the KERS 1 may be connected to the drivetrain between an output from a prime mover 3 and an input to a continuously variable transmission (CVT) 5, or else it may be connected to the primary transmission output. The first shaft 10 has a spur gear 7 which meshes with a drive gear 9 which is selectively connected to the prime mover 3 via a clutch 11. The CVT 5 is connected to a pair of drive axles 13 via a propeller shaft 15 and a differential 17. A drivetrain brake or retarder 19 may also be provided on the propeller shaft 15.

The KERS of the present invention has a high life cycle and also the ability to reach deep discharge. It can, also be charged and discharged quickly. It can also perform well in higher temperature operating environments which are typical in heavy duty vehicle applications. It is compact and has better round trip efficiency than alternative KERS systems, which store kinetic energy via electrical, hydraulic or pneumatic means.

The compact arrangement of the various illustrated embodiments of the present invention ensures greater flexibility for engineers and designers as to where the KERS may be located in a vehicle. In preferred embodiments which incorporate the starter motor such that the engine can be started via the flywheel alone, the present invention also allows a smaller starter motor to be employed which also has packaging benefits for engineers and designers.

With a hydraulic variator comprised of two bent axis motors fluidly connected back-to-back, the present invention also provides a variator which has infinitely variable control. This is particularly beneficial in a KERS transitioning between the various modes described above, but this variator is not limited to use in the above-described KERS and may be used in other applications outside of KERS.

In embodiments where the present invention utilises a pair of flywheels, the KERS effectively has double the kinetic energy storage capacity of a single flywheel system.

The lacking one-way clutch arrangement of the first planetary ensures that charging of the flywheel will occur automatically when engine speed is higher than the relative speed of the flywheel. In addition, as discussed above, locking the first ring, gear against rotation in either direction ensures fast, discharging of the energy stored in the KERS. However, whilst these are benefits of the locking one-way clutch it should be understood that this is an optional feature which may be omitted from the present invention in favour of a conventional first planetary arrangement.

In the preferred embodiments, the two motors are described as both being of variable displacement. However, one motor (e.g. the first motor) may be a variable displacement motor whilst the other (e.g. the second motor) may have a fixed displacement. In addition, the variator described in relation to the illustrated embodiments is unidirectional, in that the hydraulic fluid may only flow across the motors in a single direction. However, the variator may be adapted in order to include a directional valve which can be actuated in order to provide bi-directional flow of the fluid between the motors.

In the illustrated embodiments, planetary gears provide speed-up gear arrangements for the KERS. Whilst planetary gears are the preferred speed-up gear arrangements it should be understood that these planetaries may be replaced with an alternative arrangement such as spur gears, for example.

Whilst it is preferred that a starter motor is included in the KERS of the present invention it is not an essential element thereof. The KERS may be provided without the starter motor if desired.

These and other modifications and improvements may be incorporated without departing from the scope of the present invention as defined in the claims.

The invention claimed is:

1. A kinetic energy recovery system (KERS), comprising:
   a first speed-up gear arrangement having an input connectable to a vehicle powertrain;
   a hydraulic variator comprising first and second bent axis motors fluidly connected to one another, wherein at least the first motor is a variable displacement motor, and the first motor is connected to an output of the first speed-up gear arrangement;
   a second speed-up gear arrangement having an input connected to the second motor; and
   at least one flywheel connected to an output of the second speed-up gear arrangement, the at least one flywheel located in a vacuum within at least one flywheel chamber.

2. The KERS of claim 1, further comprising an electric starter motor, the starter motor connected to at least one of the second speed-up gear arrangement and the at least one flywheel.

3. The KERS of claim 1, wherein the first speed-up gear arrangement is a first planetary gear having a first ring gear and a one-way clutch which is adapted so as to ensure that the first ring gear can only rotate in one direction.

4. The KERS of claim 1, wherein the first planetary gear includes a locking mechanism adapted to selectively lock the first ring gear against rotation in either direction.

5. The KERS of claim 1, wherein both the first and second motors are variable displacement motors.

6. The KERS of claim 1, wherein the second speed-up gear arrangement comprises second and third planetary gears arranged in series with one another.

7. The KERS of claim 1, further comprising an idler gear connected between the second motor and the second speed-up gear arrangement, whereby the second speed-up gear arrangement and at least one flywheel are offset in relation to the remainder of the KERS.

8. The KERS of claim 1, further comprising an idler gear connected between the second speed-up gear arrangement and the at least one flywheel, whereby the at least one flywheel is offset in relation to the remainder of the KERS.

9. The KERS of claim 1, the at least one flywheel further comprising a pair of flywheels co-axially arranged and connected to the second speed-up gear arrangement.

10. The KERS of claim 1, wherein the at least one flywheel comprises first and second flywheels and the KERS further comprises
   a first idler gear connected between the second speed-up gear arrangement and the first flywheel; and
   a second idler gear connected between the second speed-up gear arrangement and the second flywheel;
   wherein the first and second flywheels are offset from one another and the remainder of the KERS.

11. A vehicle powertrain comprising the KERS according to claim 1.

12. The KERS of claim 1, wherein the first motor is a variable displacement motor and the second motor is a fixed displacement motor.

13. The KERS of claim 1, wherein both the first and second motors are variable displacement motors.

14. A method of controlling a kinetic energy recovery system (KERS) comprising a first speed-up gear arrangement connected to a vehicle powertrain and/or engine, a hydraulic variator comprising first and second bent axis motors fluidly connected to one another, a second speed-up gear arrangement and at least one flywheel connected to an output of the second speed-up gear, arrangement, the method comprising the steps of:
   monitoring the vehicle powertrain for changes in at least one of operating status and power demands; and
   varying the displacement of at least one of the two motors so as to charge or discharge the KERS in response to the changes in at least one of the operating status and power demand of the vehicle powertrain.

15. The method of claim 14, wherein the KERS further comprises a starter motor connected to at least one of the second speed-up gear arrangement and the at least one flywheel, the method further comprising the steps of:
receiving an engine start command during the monitoring step;
setting the displacement of the at least one motor to zero;
activating the starter motor so as to rotate the at least one flywheel; and
increasing the displacement of the at least one motor from zero so as to transfer kinetic energy from the flywheel to the powertrain in order to start the engine.

* * * * *